April 28, 1959  M. L. BENJAMIN  2,883,886
INDEX FIXTURE

Filed Feb. 25, 1954  4 Sheets-Sheet 1

INVENTOR.
MILTON L. BENJAMIN
BY
Oberlin & Limbach
ATTORNEYS

April 28, 1959  M. L. BENJAMIN  2,883,886
INDEX FIXTURE

Filed Feb. 25, 1954  4 Sheets-Sheet 2

INVENTOR.
MILTON L. BENJAMIN
BY
Oberlin & Limbach
ATTORNEYS.

April 28, 1959 M. L. BENJAMIN 2,883,886
INDEX FIXTURE

Filed Feb. 25, 1954 4 Sheets-Sheet 3

INVENTOR.
MILTON L. BENJAMIN
BY
Oberlin & Limbach
ATTORNEYS

April 28, 1959  M. L. BENJAMIN  2,883,886
INDEX FIXTURE

Filed Feb. 25, 1954  4 Sheets-Sheet 4

INVENTOR.
MILTON L. BENJAMIN
BY
Oberlin & Limbach
ATTORNEYS

United States Patent Office 2,883,886
Patented Apr. 28, 1959

2,883,886

INDEX FIXTURE

Milton L. Benjamin, Cleveland, Ohio, assignor to Erickson Tool Company, a corporation of Ohio Application February 25, 1954, Serial No. 412,491

4 Claims. (Cl. 74—821)

The present invention relates generally as indicated to an index fixture, and more particularly to an index fixture of the general type disclosed in the Milton L. Benjamin et al. Patent No. 2,600,960, granted June 17, 1952, which has associated therewith a novel shock absorber with provides for rapid, accurate indexing with smooth cushioning as the rotary tool or work carrying assembly approaches an indexed position.

The index fixture to which the present invention relates is intended for use in connection with machine tools and the like wherein, for example, it is required to predeterminedly relatively rotate a workpiece and a tool to position the former for operation upon by the latter. One illustrative example is the milling of uniformly spaced longitudinal slots in contractible collets and the like in which, after the forming of one slot, it is necessary to index the collet or the milling cutter for forming a succeeding slot. Obviously, in order to achieve maximum production, the indexing should be accomplished in a minimum of time, but, on the other hand, the large inertia forces involved in the rapid indexing of relatively large masses imposes excessive stresses on the motion arresting and locking pin or the like which is effective to stop the rotary indexing part of the fixture in its indexed position and to lock the same in such position. In order to maintain the locking pin and other parts under safe stresses, it has been heretofore the practice to index at a reduced speed, and, consequently, at the expense of reduced production.

It is a primary object of this invention to provide an index fixture which, in combination with a novel shock-absorbing system, enables rapid indexing while smoothly cushioning or decelerating the indexing movement so that just an instant before the final indexed position, the rotary indexing part of the fixture is subjected to the greatest resilient retarding force. Therefore, as the locking pin drops into locking engagement with the ratchet wheel of the indexing part, it is not subjected to any severe shearing or bending loads or to any severe shock.

It is another object of this invention to provide an index fixture which has associated therewith a shock-absorbing system so designed that the movement of the indexing pawl and the relatively light parts which carry the same are moved with desired rapidity throughout the entire stroke, but then the opposite stroke thereof, together with the indexing part engaged thereby, is properly and effectively cushioned to eliminate the severe shock and stresses aforesaid.

Other objects and advantages of the present invention will become apparent as the following description proceeds.

To the accomplishment of the foregoing and related ends, the invention, then, comprises the features hereinafter fully described and particularly pointed out in the claims, the following description and the annexed drawings setting forth in detail certain illustrative embodiments of the invention, these being indicative, however, of but a few of the various ways in which the principle of the invention may be employed.

In said annexed drawings:

Fig. 1A is a fragmentary elevation view showing the locking plunger and the cam plate for actuating the same;

Figure 1:
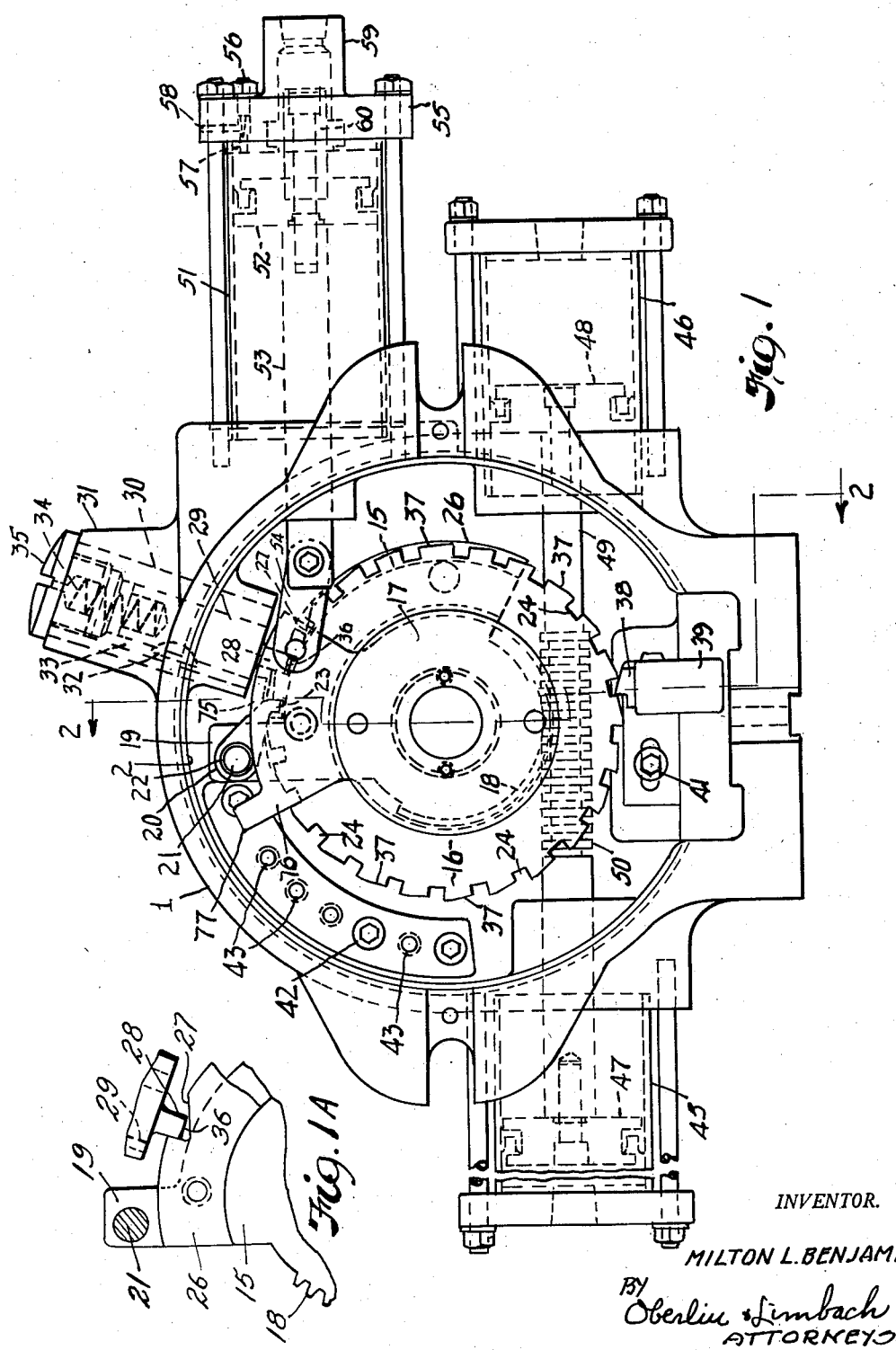
Fig. 1 is a rear elevation view of a preferred form of the index fixture, the back cover plate having been removed to more clearly illustrate the construction of the parts within the housing of said fixture.
Figure 2:
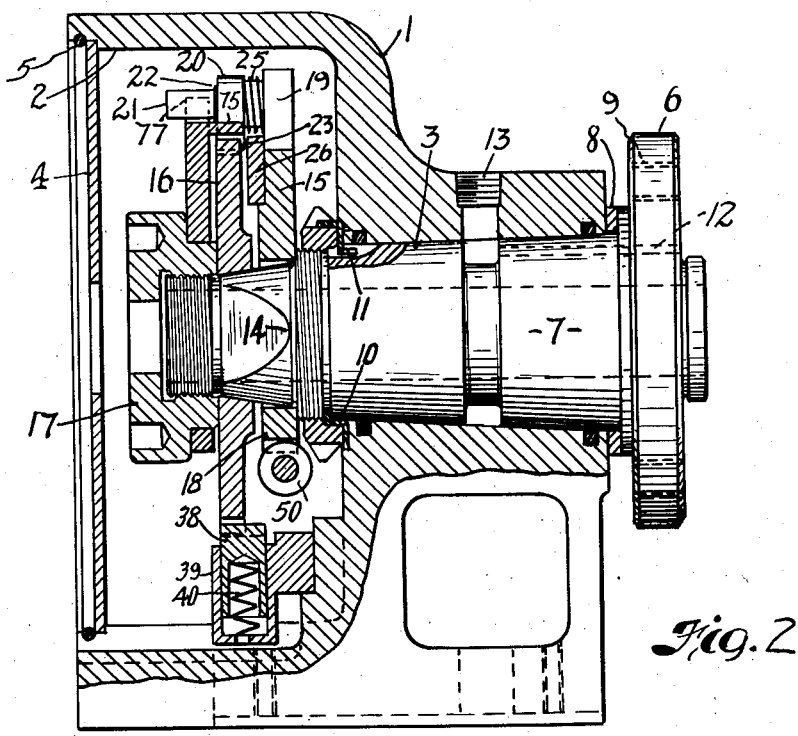
Fig. 2 is a cross-section view taken substantially along the line 2—2, Fig. 1.

Referring now to the drawings and first more especially to Figs. 1 and 2 thereof, there is shown a housing 1 formed with a recess 2 and a bore 3, preferably tapered as shown, leading into such recess. The recess 2 is closed as by means of a cover plate 4 which is fitted into the open end of said recess and is held in place therein as by means of the snap ring 5.

Rotatable in said bore 3 is a spindle 6 which includes an intermediate tapered section 7 having the same taper as the bore 3 and provided with a spacer 8 adjacent the flange 9 formed adjacent one end thereof and with a lock nut 10 threaded onto the other end thereof, said lock nut being held against rotation from adjusted position as by means of the lock washer 11 which is keyed to said spindle and which has one or more prongs bent as shown to engage in grooves or notches formed in the periphery of said lock nut 10. As is apparent, the employment of a tapered bore 3 and tapered spindle 6 enables the taking up of any wear of the interengaged surfaces to eliminate lateral looseness. The front end of the spindle 6 is suitably formed to enable mounting of a workpiece thereon, and in some instances even an air-operated chuck may be mounted onto said spindle for gripping a workpiece or a tool. When an air-operated chuck is employed, the spindle will be formed with a passage 12 for the supply of air from the port 13 of housing 1 to the chuck.

The rear end of spindle 6 extends into recess 2 and is formed with a bearing surface 14 on which a pawl support member 15 is rotatable, and adjacent said pawl support member and non-rotatable on said spindle (as by means of interfitting tapered square portions) is a ratchet wheel 16, said pawl support member and said ratchet wheel being axially retained on said spindle as by means of the spindle nut 17. As will hereinafter more fully appear, ratchet wheel 16 and spindle 6 constitute a driven rotary indexing member, whereas said pawl support member 15 operates as a driving member.

Figure 7:
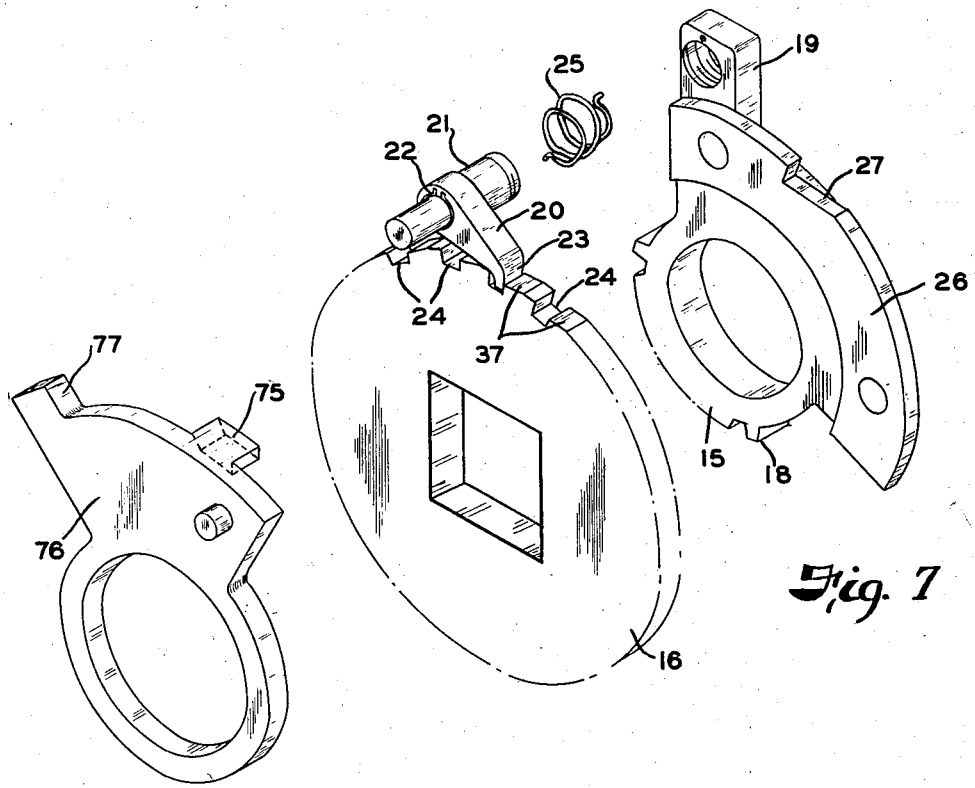
Fig. 7 is an exploded isometric view showing the driving pawl support member and the parts with which the driving pawl engages in operation.

Said pawl support member 15 (see especially Fig. 7) comprises a gear segment 18 concentric with the axis of rotation of said member and a radially projecting lug 19 to which a driving pawl 20 is pivotally mounted through the intermediary of a pawl bolt 21 threaded into said lug and provided with a snap ring 22 retaining said pawl on said bolt. The end 23 of said pawl is adapted to be engaged in one of the interdental spaces or notches 24 in the periphery of said ratchet wheel 16 and is so formed as to click over the ratchet wheel notches only in the counter-clockwise direction of movement of said pawl and its support member. A torsion spring 25 around the bolt 21 having its axially directed ends fitting into holes in said pawl 20 and lug 19 respectively, is operative to rotate the pawl to a position with the end 23 thereof disposed in one of the interdental spaces 24.

Bolted or otherwise attached to said pawl support member 15 is an arcuate cam plate 26 (see Figs. 1, 1A, and 2) which is formed with a cam surface 27 engageable with the inner end 28 of a locking plunger or lock member 29 which is radially reciprocably mounted in said housing 1. Said locking plunger 29 is reciprocable in tubular, exteriorly tapered insert 30 driven into the boss 31 of said housing, said locking plunger being held against rotation as by means of the key 32 thereof which is slidable in a complementary keyway 33 in said insert. Said plunger is urged radially inward by means of the compression spring 34 which is interposed between said plunger and a cap 35 threaded into the outer end of said boss 31. The inner end 28 of said plunger 29 may be slightly tapered on its opposite sides, and the end surface 36 thereof may be at an angle relative to the axis of the plunger so as to facilitate the entry of the plunger end into the desired interdental spaces or notches 24 between the teeth of the ratchet wheel 16. The teeth of said ratchet wheel slope on one side as represented by the reference numeral 37 so that, as the ratchet wheel rotates and the cam surface 27 of the cam plate 26 has disengaged from the plunger end 28, the latter may move radially inward so that its left side abuts the righthand side of the next tooth to thus arrest the rotation of the ratchet wheel 16.

In order to hold ratchet wheel 16 against rotation during the counter-clockwise rotation of the pawl support member 15, there is provided a spring-actuated holding pawl 38 slidably supported in a block 39, said pawl being urged into engagement with the ratchet wheel as by means of the compression spring 40. The pawl mounting block 39 is adjustably mounted in the housing by the screw 41 so that said pawl may be adjusted back and forth to engage the side of the ratchet wheel tooth thereadjacent when the locking plunger is properly engaged with one of the interdental spaces of the ratchet wheel.

The lug 19 of said pawl support member 15 is engageable with a stop pin 42 in housing 1 to limit the extent of counter-clockwise movement of said member 15, said stop being insertable into any one of a plurality of openings 43, whereby the indexing movement may constitute any multiple of the angle between successive notches of the twenty-four tooth ratchet wheel 16, herein shown for purposes of illustration.

Oscillation of said pawl support member 15 in opposite directions is effected by reciprocation of the movable element of a fluid power device, said fluid power device as herein illustrated comprising coaxial single-acting cylinders 45 and 46 secured on opposite sides of housing 1 and a movable element in the form of pistons 47 and 48 respectively reciprocable in said cylinders and having a common piston rod 49 therebetween formed with annular grooves 50 in engagement with the teeth of the gear segment 18. With an arrangement as shown, the rotary or lateral disposition of the piston rod 49 does not, in any way, change the rotary position of the gear segment 18.

Figure 3:
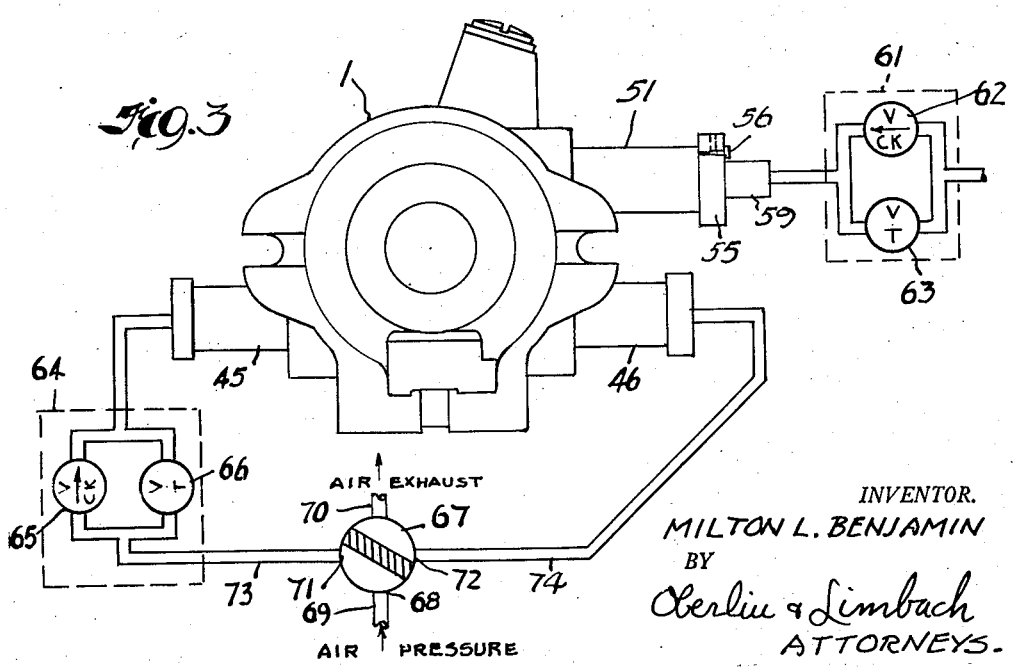
Fig. 3 is a schematic piping diagram showing the air pressure supply pipe, the four-way valve, and the flow control valves for achieving the desired ends of the invention.
Figure 4:
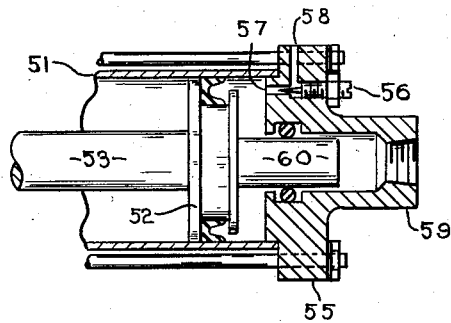
Fig. 4 is a cross-section view of the indexing cushioning cylinder which appears at the upper right-hand side of Fig. 1.
Figure 5:
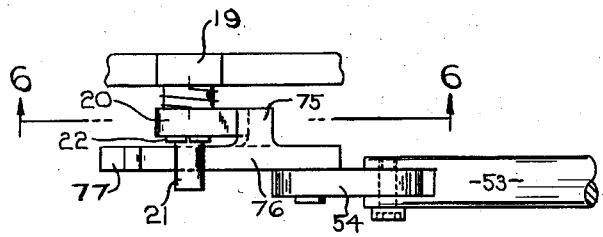
Fig. 5 is a fragmentary plan view of the lost-motion mechanism which is disposed between the cushioning cylinder (Fig. 4) and the indexing pawl support member to cushion the indexing movements of a ratchet wheel, and which is operative to prevent overrunning of the ratchet wheel.
Figure 6:
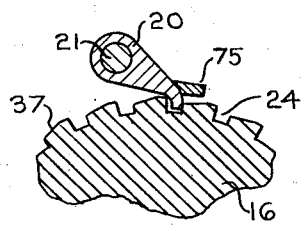
Fig. 6 is a cross-section view taken substantially along the line 6—6, Fig. 5.

There is also secured to housing 1 (see Figs. 1 and 4) a cylinder 51 in which a piston 52 is reciprocable, the piston rod 53 thereof being connected by a link 54 to the lost motion part 76 on the pawl support member 15. Attached to this cylinder 51 is a cylinder head 55 which carries an adjustable needle valve 56 to control the rate of exhaust of air from said cylinder through the passages 57 and 58. The cylinder head 55 constitutes a second cylinder 59 into and out of which the small piston extension 60 reciprocates. Connected to said head 55, and as best shown in Fig. 3, is a flow control valve 61 which essentially comprises a check valve 62 and a throttle or needle valve 63 arranged in parallel so that air may freely pass into the cylinder 51 through the check valve 62, but air from said cylinder can only be exhausted through the adjustable throttle valve 63.

It is thus apparent that, when the piston 52 and its piston extension 60 are at the lefthand end of the cylinder 51 and are moved toward the right, air in said cylinders 51 and 59 will be exhausted, not only through the needle valve 56, but also through the throttle valve 63 whereby some cushioning of the righthand movement may be effected, if desired. Then, when the extension 60 enters the small cylinder 59, the air trapped in cylinder 51 can escape through the needle valve 56 which preferably will be adjusted so as to permit only a very slow exhaust of air; and, of course, the air displaced by the extension 60 will yet continue to be exhausted through the throttle valve 63. Thus, at this stage, a large cushioning or retarding action is effected on the continued righthand movement of said piston 52 and extension 60.

A similar flow control valve 64 including a check valve 65 and throttle valve 66 is preferably connected to the lefthand actuating cylinder 45. As shown in Fig. 3, a four-way valve 67 has one of its ports 68 connected to an air pressure supply pipe 69, another port 70 open to the atmosphere, and two other ports 71 and 72 respectively connected by pipes 73 and 74 to the flow control valve 64 and to the other actuating cylinder 46 respectively.

Now, when the four-way valve 67 is in the position shown, air will pass freely through the flow control valve 64 into the lefthand cylinder 45, thereby causing the pistons 47 and 48 and piston rod 49 to move toward the right at a reasonably rapid rate, the cylinder 46 being connected to the atmosphere through the pipe 74 and the four-way valve 67. The righthand movement of said pistons 47 and 48 and rod 49 causes the pawl support member 15 to be rotated through gear segment 18 in a counterclockwise direction until the lug 19 thereof engages the stop pin 42, carrying with it the driving pawl 20 and causing lefthand movement of the shock-absorber piston 52 in its cylinder 51 through the piston rod 53 and link 54 connection with the lost motion part 76 of the pawl support member 15. As the pawl support member 15 thus swings in a counterclockwise direction, the cam plate 26 thereof forces the locking plunger end 28 radially outward to disengage the end thereof from the interdental space of the ratchet wheel 16. Of course, during this counterclockwise rotation of the pawl support member 15, the ratchet wheel 16 is held against counterclockwise rotation by the holding pawl 38.

Now, when the four-way valve 67 is reversed, air under pressure will be admitted to the righthand cylinder 46, and the exhaust from the lefthand cylinder will have to pass through the throttle valve 66 and thence through the four-way valve 67 to the atmosphere, the rate of flow being controlled by adjustment of said throttle valve. This adjustment will usually be made so that the movement of the pistons 47 and 48 and piston rod 49 toward the left will progress rather rapidly. As the pistons 47 and 48 and rod 49 thus move toward the left, the pawl support member 15 is driven in clockwise direction, the pawl 20 being engaged in one of the teeth of the ratchet wheel 16 and being held therein by means of the lateral cam lug 75 of the lost-motion part 76 on said support member 15 to which link 54 is connected. See Figs. 1, 2, 4, 5 and 6. This cam lug 75 prevents overrunning of the ratchet wheel 16 and spindle 6. As the pawl support member 15, together with part 76, thus rotates clockwise, first a relatively small retarding force is applied thereon through the combination large-small piston 52—60 moving toward the right in the cylinder 51, but as the pawl support member 15 approaches the indexing position, the small piston 60 enters the small cylinder 59, whereby air is trapped in the annular space in cylinder 51 and can only escape through the closely adjusted needle valve 56, and thus the pawl support member 15 is practically instantly halted within a very short portion of the stroke end of the indexing stroke, and at this time the cam plate 26 has disengaged the locking plunger end 28 so that said plunger 29 can move radially inward along the sloped portion 37 of the ratchet wheel tooth next to the indexing notch, and then finally pops in radially into locking position to securely and accurately hold the ratchet wheel 16, the spindle 6, and the workpiece or tool mounted on said spindle in the indexed position.

Referring further to the lost-motion part 76, the same is rotatable on spindle nut 17 and has a projection 77 engaged by the side of the pawl bolt 21 after the initial part of the counterclockwise rotation of the support member 15. Such lost-motion permits the driving pawl 20 to disengage the lateral cam lug 75 and to click over the teeth of ratchet wheel 16. With the driving pawl 20 engaged in a new notch 24, the initial clockwise rotation of the support member 15 causes the pawl bolt 21 to move away from projection 77 whereby said pawl is positioned under the inclined face of lug 75 and thus when cushioning action is applied through piston rod 53 and link 54 on the lost-motion part 76, the ratchet wheel 16, spindle 6, and parts mounted on the latter are prevented from overrunning the pawl support member 15 and driving pawl 20 carried thereby.

Other modes of applying the principle of the invention may be employed, change being made as regards the details described, provided the features stated in any of the following claims, or the equivalent of such, be employed.

I therefore particularly point out and distinctly claim as my invention:

1. An index fixture comprising a housing; a spindle rotatable in said housing; a ratchet mechanism including a ratchet wheel non-rotatably fixed to said spindle, a driving member movable in opposite directions and having a driving pawl communicating forward motion of said driving member and driving pawl to said ratchet wheel, a holding pawl for preventing backward motion of said ratchet wheel, a spring actuated locking plunger engageable with said ratchet wheel to prevent backward and forward motion thereof, and a cam on said driving member operative to effect disengagement of said locking plunger from said ratchet wheel during the backward motion of said driving member and to permit re-engagement of said locking plunger with said ratchet wheel as said driving member approaches the end of its forward motion, said driving member comprising two parts having a lost-motion connection between them whereby during initial backward motion of one part the driving pawl carried thereby may click on said ratchet wheel, the other part being formed with a cam which is engaged by said driving pawl after the initial forward motion of said one part to hold said driving pawl in forward driving engagement with said ratchet wheel, and forward motion retarding means acting through said other part and its cam to retard forward motion of said one part and to prevent forward overrunning of said ratchet wheel and spindle with respect to said driving member.

2. The index fixture of claim 1 wherein said forward motion retarding means comprises a cylinder mounted on said housing, a piston reciprocable in said cylinder and linked to said other part, and means effecting a restricted displacement of fluid from said cylinder as said piston approaches the end of its forward motion in said cylinder as a consequence of the approach of the end of the forward motion of said driving member.

3. The index fixture of claim 2 wherein a fluid pressure actuating means is operatively connected to said one part to impart forward and backward motion thereto.

4. The index fixture of claim 3 wherein said fluid pressure actuating means includes a flow control valve effective to control the forward motion of said one part at a desired rate of speed while permitting a more rapid backward motion thereof.

References Cited in the file of this patent

UNITED STATES PATENTS

| | | |
|---|---|---|
| 676,378 | Wolfe | June 11, 1901 |
| 2,361,739 | Bobst | Oct. 31, 1944 |
| 2,549,746 | Kylin et al. | Apr. 17, 1951 |
| 2,553,810 | Carlson | May 22, 1951 |
| 2,600,960 | Benjamin et al. | June 17, 1952 |
| 2,622,487 | Schultz | Dec. 23, 1952 |
| 2,646,152 | Retz | July 21, 1953 |
| 2,754,700 | Benjamin et al. | July 17, 1956 |